(12) United States Patent
Nikas (10) Patent No.: US 8,850,708 B2
(45) Date of Patent: Oct. 7, 2014

(54) TRIMMER AND DOUBLE ACTING BLADE ASSEMBLIES FOR TRIMMERS

(76) Inventor: Alex Nikas, San Francisco, CA (US)

( * ) Notice: Subject to any disclaimer, the term of this patent is extended or adjusted under 35 U.S.C. 154(b) by 300 days.

(21) Appl. No.: 13/300,397

(22) Filed: Nov. 18, 2011

(65) Prior Publication Data
US 2013/0125404 A1    May 23, 2013

(51) Int. Cl.
*B26B 7/00*        (2006.01)
*B26B 19/06*       (2006.01)

(52) U.S. Cl.
USPC ............................................ 30/43.92; 30/210

(58) Field of Classification Search
USPC .................. 30/43.9, 43.92, 210; 83/694
See application file for complete search history.

(56) References Cited

U.S. PATENT DOCUMENTS

| | | | | |
|---|---|---|---|---|
| 155,855 A * | 10/1874 | Burgess | | 30/210 |
| 518,204 A * | 4/1894 | Bell | | 30/210 |
| 547,718 A * | 10/1895 | Fletcher | | 30/210 |
| 1,115,328 A * | 10/1914 | Murran | | 30/223 |
| 1,354,458 A * | 9/1920 | Riggs | | 30/197 |
| 1,875,125 A * | 8/1932 | Oster et al. | | 30/221 |
| 2,080,451 A * | 5/1937 | Wilcox | | 30/210 |
| 2,277,080 A * | 3/1942 | Davis | | 30/124 |
| 2,322,610 A * | 6/1943 | Wilcox | | 173/59 |
| 2,651,107 A * | 9/1953 | Bartlett | | 30/219 |
| 2,840,904 A * | 7/1958 | Hutchins | | 30/210 |
| 3,372,481 A * | 3/1968 | Skinner | | 30/210 |
| 3,970,912 A | 7/1976 | Hoffman | | |
| 4,619,045 A | 10/1986 | Mayer | | |
| 4,711,030 A | 12/1987 | Ruston et al. | | |
| D298,601 S | 11/1988 | Tsuji | | |
| 4,827,616 A | 5/1989 | Sistare | | |
| D348,184 S | 6/1994 | Neshat et al. | | |
| 5,402,576 A * | 4/1995 | Kiyooka et al. | | 30/216 |
| 5,412,873 A | 5/1995 | Gibson | | |
| 5,473,818 A * | 12/1995 | Otsuka et al. | | 30/43.9 |
| 5,640,837 A | 6/1997 | Ueyama | | |
| 6,098,288 A * | 8/2000 | Miyagawa et al. | | 30/43.91 |
| 6,276,060 B1 * | 8/2001 | Faulstich et al. | | 30/34.1 |
| D469,321 S | 1/2003 | Smith et al. | | |
| 7,251,896 B2 * | 8/2007 | Khubani | | 30/199 |
| 7,581,319 B1 * | 9/2009 | Little et al. | | 30/43.92 |
| 7,757,404 B2 * | 7/2010 | Ouchi et al. | | 30/43.91 |
| 8,176,637 B2 * | 5/2012 | Fukutani et al. | | 30/201 |
| 2005/0262695 A1 * | 12/2005 | Ouchi et al. | | 30/43.92 |
| 2007/0050991 A1 * | 3/2007 | Mooney et al. | | 30/210 |
| 2010/0299930 A1 * | 12/2010 | Voorhorst et al. | | 30/43.92 |
| 2011/0005081 A1 * | 1/2011 | Ouchi et al. | | 30/43.92 |
| 2012/0240409 A1 * | 9/2012 | Inoue et al. | | 30/43.92 |

* cited by examiner

*Primary Examiner* — Sean Michalski
(74) *Attorney, Agent, or Firm* — Meyer IP Law Group (57) ABSTRACT

A pair of blades, one or both of which reciprocates along a longitudinal axis, comprises a first blade and a second blade, each blade having a proximal end, a distal end, a length extending between, and a cutting edge extending along a portion of the length to the distal end. A width of each blade is stepwise reduced along the cutting edge to the distal end so that one or more teeth from a series of teeth has a cutting surface that is receded relative to a tooth from the series of teeth that is closer to the proximal end. The teeth of the series of teeth are uniformly oriented relative to the longitudinal axis.

21 Claims, 10 Drawing Sheets

TRIMMER AND DOUBLE ACTING BLADE ASSEMBLIES FOR TRIMMERS

FIELD OF THE INVENTION

This invention relates to trimmers and double acting trimming blade assemblies.

BACKGROUND OF THE INVENTION

Trimmers that utilize double acting blade assemblies rely on a scissoring action whereby a pair of cutting blades having laterally projecting teeth move back and forth in opposite directions. The opposing reciprocation of the blades alternatively creates and closes openings between teeth. Hedge trimmers, for example, capture leaves and branches within the openings which are then severed as the openings close, trimming the hedge.

Existing trimmers typically include uniformly shaped and arranged teeth extending from opposite edges of the blades. Such blades can be efficient for removing large amounts of material. However, high precision can be difficult to achieve and tight spaces may not be easily negotiable with such blades.

SUMMARY OF THE INVENTION

Embodiments of the present invention are related to trimmers and pairs of blades for use with trimmers. In an embodiment, a pair of blades, one or both of which is adapted to be reciprocated along a longitudinal axis, comprises a first blade and a second blade, each blade having a proximal end, a distal end, a length extending between the proximal end and the distal end, and a cutting edge extending along a portion of the length to the distal end. The cutting edge of each blade includes a series of teeth. A width of each blade is stepwise reduced along the cutting edge to the distal end so that one or more teeth from the series of teeth has a cutting surface that is receded relative to a tooth from the series of teeth that is closer to the proximal end. The teeth of the series of teeth are uniformly oriented relative to the longitudinal axis. In a further embodiment, the teeth of the series of teeth of the first and second blade are generally uniform in size and shape. The teeth can be shaped as isosceles triangles, although in other embodiments the teeth can have some other shape.

DETAILED DESCRIPTION OF THE DRAWINGS

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. In addition, the first digit of a reference number identifies the embodiment in which the reference number first appears.

Figure 1:
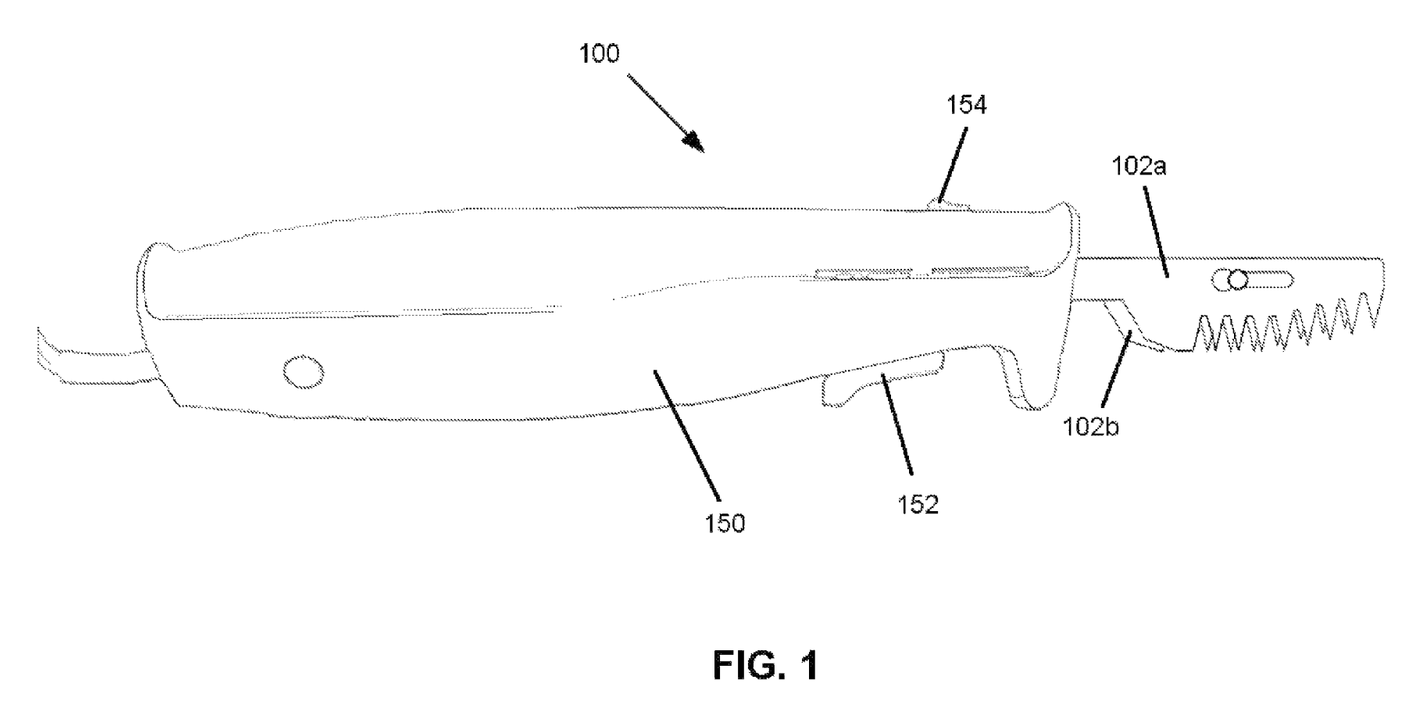
FIG. 1 is a side view of an embodiment of a trimmer in accordance with the present invention comprising a double acting blade assembly including a pair of blades each having a width that is stepwise reduced along the cutting edge.

FIG. 1 is a side view of an embodiment of a trimmer 100 in accordance with the present invention. A blade assembly 102 comprising a first blade 102a and a second blade 102b extends from a housing 150 of the trimmer 100. Within the housing 150 is a motor (not shown) that reciprocates the blades 102a, 102b back and forth relative to one another along an axis. A trigger 152 extends from the housing 150 and activates the motor when engaged. The motor can be deactivated by releasing the trigger. Alternatively, a rocker switch, slide switch, or any other activation mechanism can be used. In some embodiments, the reciprocation speed can be adjusted by a switch 154, or alternatively some other mechanism, such as a knob.

Figure 2A:
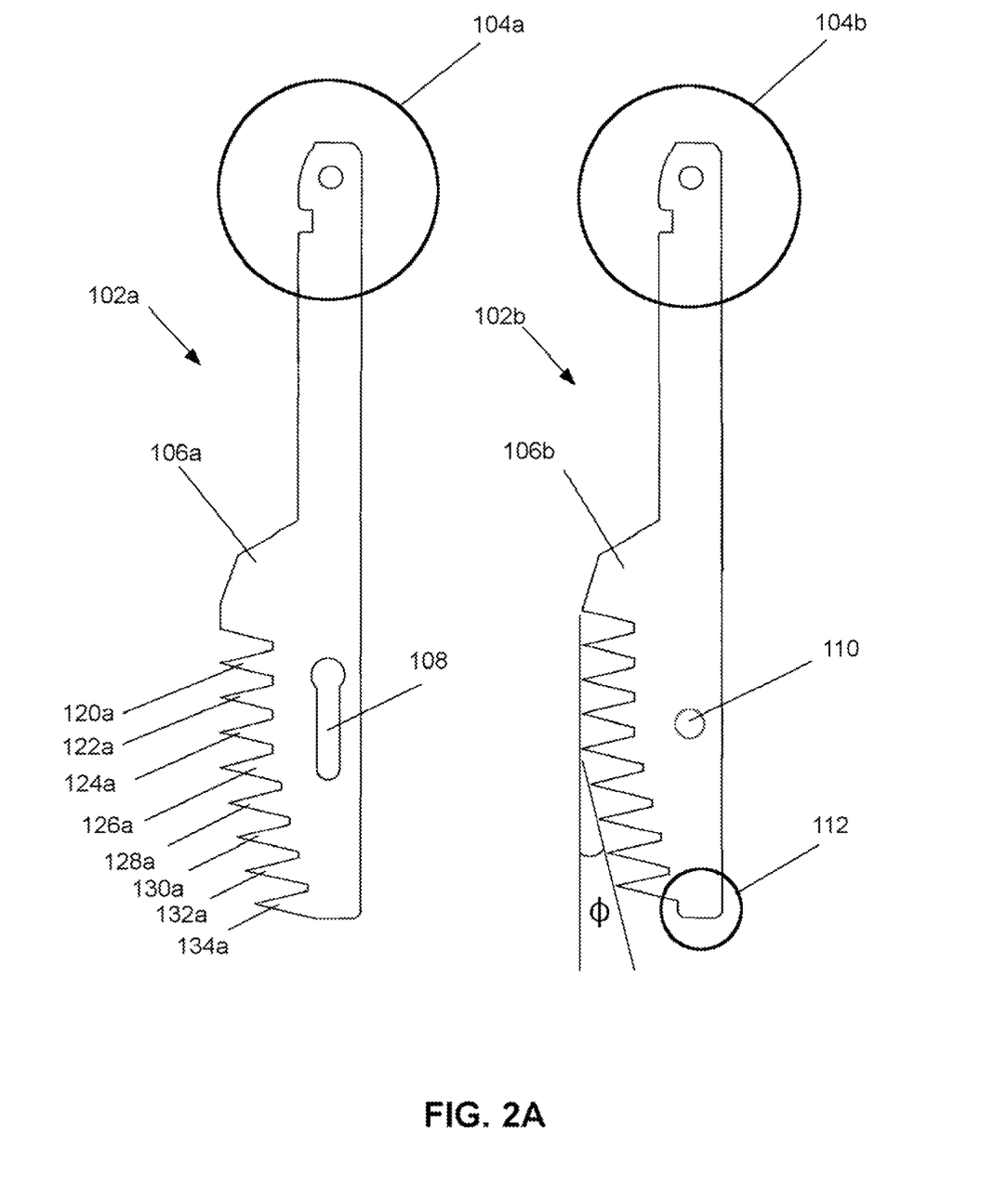
FIG. 2A is a side view of the double acting blade assembly used in the embodiment of FIG. 1.
Figure 2B:
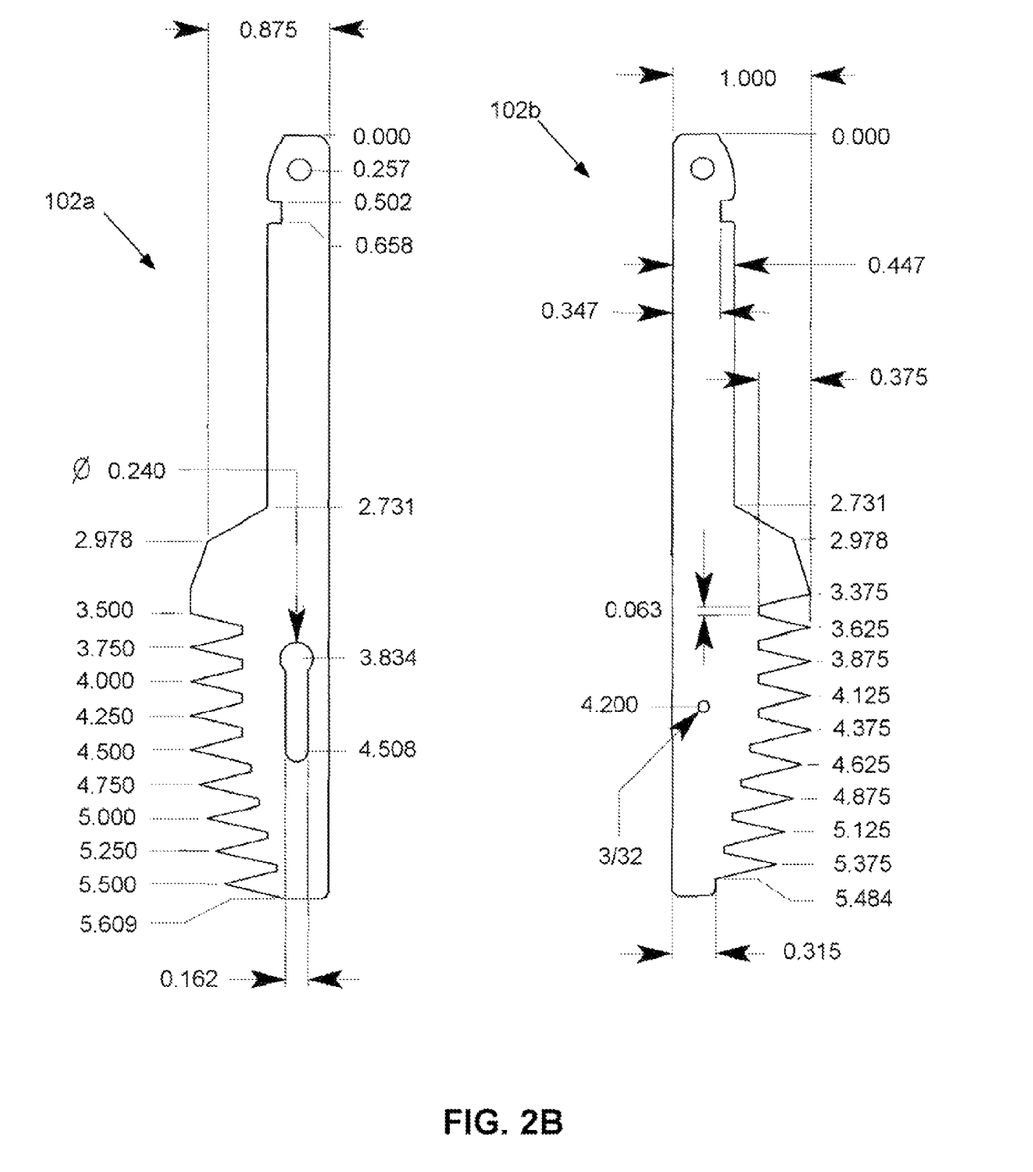
FIG. 2B illustrates exemplary dimensions for the double acting blade assembly of FIG. 2A.

FIGS. 2A and 2B are side views of an embodiment of a double acting blade assembly 102a, 102b usable with the trimmer 100 of FIG. 1. The first blade 102a and the second blade 102b each include a tang 104a, 104b at a proximal end. The tangs 104a, 104b include features (as shown, a notch and a hole) that mate with complementary features of the motor so that the blades 102a, 102b are rigidly held in place. The features need not necessarily be as shown in FIGS. 2A and 2B, but rather need only complement features of the motor that register the blades and hold the blades in place.

As shown, the first blade 102a and the second blade 102b extend from respective tangs 104a, 104b toward respective cutting edges with a generally uniform width. The cutting edges each begin at a kick 106a, 106b that flair the width of each blade 102a, 102b at one edge and not the opposite edge, which remains generally dull and does not perform any cutting. The kicks 106a, 106b are also generally dull and can help protect a hand holding the trimmer from the sharp edge of the most proximal tooth 120a of the cutting edge. The cutting edges of the first blade 102a and the second blade 102b are slightly offset, and the kick 106b of the second blade 102b is slightly smaller than the kick 106a of the first blade 102a. In other embodiments, the kicks 106a, 106b need not be shaped as shown. For example, the kicks can have an arcuate shape. In still other embodiments, the blades need not have kicks. In preferred embodiments, the width of the edge opposite the cutting edge does not flair out, so as to minify the overall width of the blade assembly. However, in other embodiments, the width of both edges can be increased. One of ordinary skill in the art, upon reflecting on the teachings contained herein, will appreciate the variety of shapes that the edges of the blades can have.

The blades 102a, 102b of the blade assembly can be held in close proximity by a rivet-in-slot arrangement. As shown in FIGS. 2A and 2B, a rivet 110 extending from one of the blades 102a, 102b can be mated with a slot 108 formed in the other of the blades 102a, 102b, a portion of which is narrower than a head of the rivet 110. An enlarged opening in the distal end of the slot 108 is large enough to receive the rivet 110. The length of the slot 108 is such that when the rivet 110 is fitted into the slot 108 and the tangs 104a, 104b of the respective blades 102a, 102b are mated with the motor, the rivet 110 is moved far enough toward the distal end of the slot 108, that the rivet 110 is held within the narrower portion of the slot 108 during the entire travel distance of the blades 102a, 102b when they are reciprocated.

The cutting edges of the blade assembly are sized and shaped to improve cutting precision and an ability to negotiate confined or narrow spaces. As shown, the width of the first blade 102a is at a maximum along the first four teeth 120a-126a from a proximal end of the cutting edge. The widths of the first blade 102a is then stepwise reduced along the cutting edge to the distal end so that the next four teeth 128a-134a have cutting surfaces that are receded relative to the teeth that are closer to the proximal end of the cutting edge. The points of the first four teeth 120a-126a are aligned parallel to an axis formed along the length of the blade 102a, while the next four teeth 128-134a are aligned at an angle F to the axis. The teeth 120a-134a of the cutting edge are substantially the same size and shape, and are oriented perpendicular to the axis formed along the length of the blade 102a. As shown, the teeth 120a-134a are shaped as isosceles triangles, although in other embodiments the teeth can have some other shape. The cutting edge of the second blade 102b, and the size, shape, and arrangement of the teeth of the second blade 102b are substantially the same as the first blade 102a. However, a portion 112 of the second blades can extend slightly past the cutting edge so that the blade lengths are the same.

FIG. 2B illustrates exemplary dimensions for the blades 102a, 102b of FIG. 2A. The dimensions are given in inches and are provided merely as examples. The invention is in no way meant to be limited to the exemplary dimensions provided.

Figure 3A:
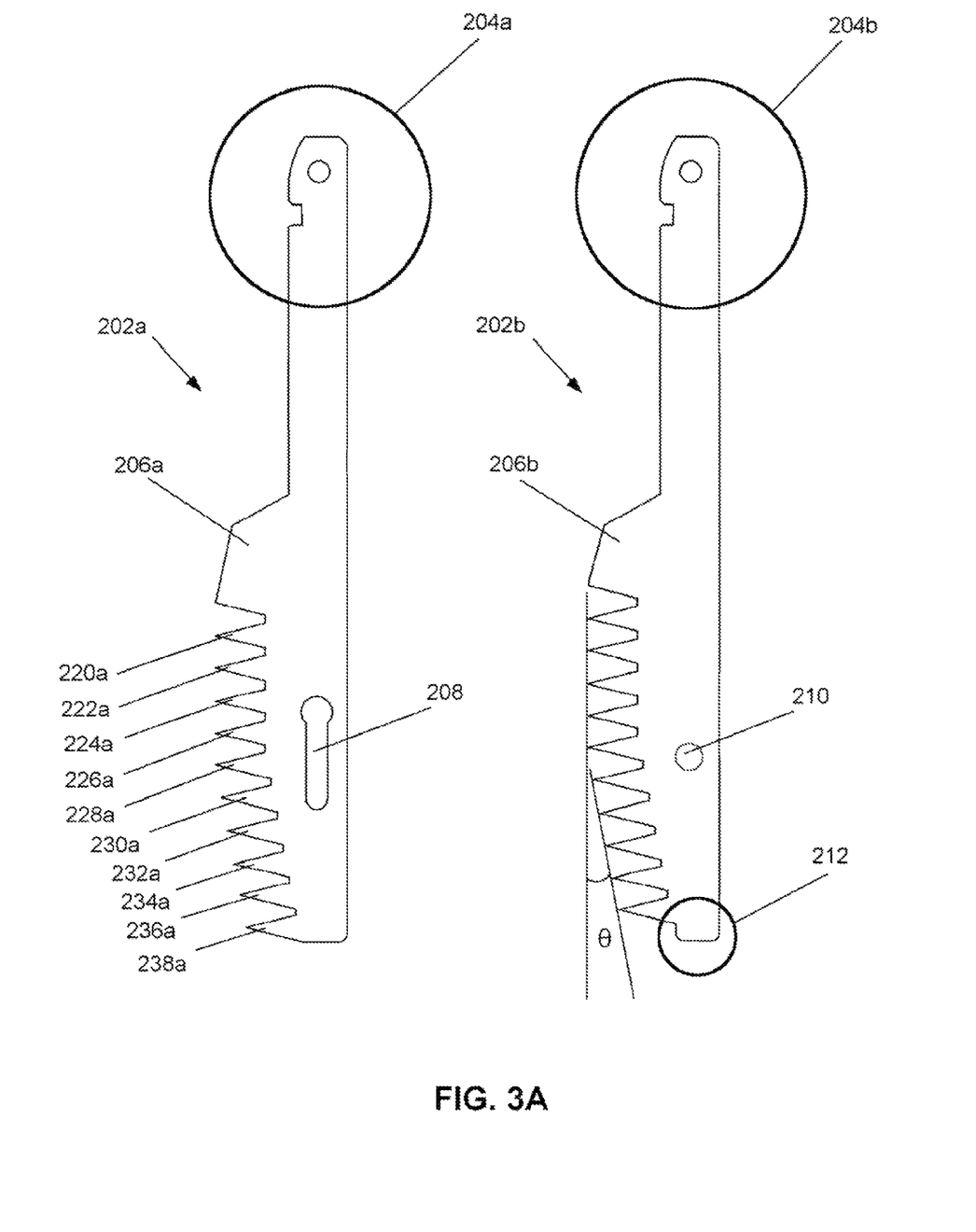
FIG. 3A is a side view of an alternative embodiment of a double acting blade assembly for use with embodiments of trimmers in accordance with the present invention.
Figure 3B:
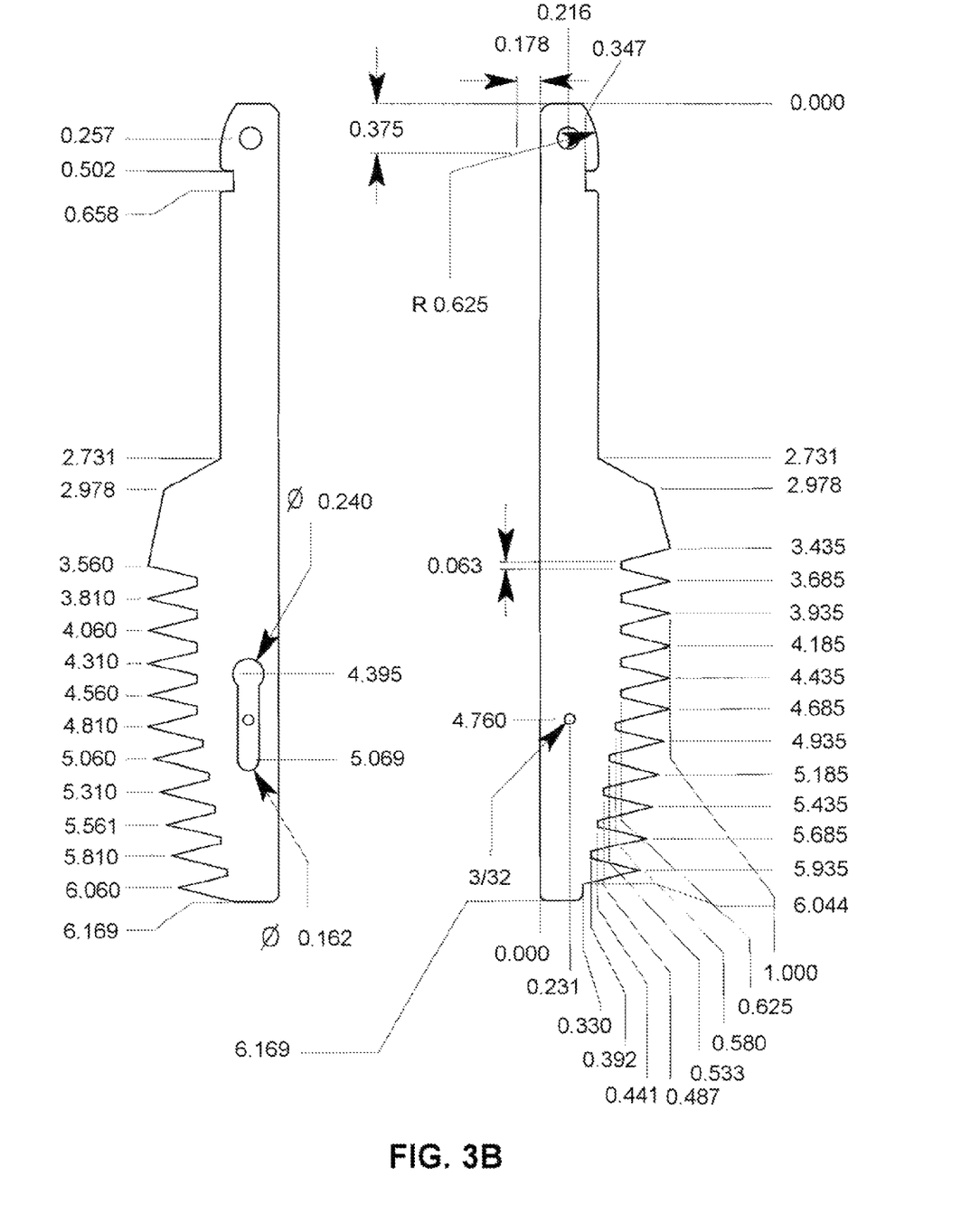
FIG. 3B illustrates exemplary dimensions for the double acting blade assembly of FIG. 3A.

FIGS. 3A and 3B are side views of an alternative embodiment of a double acting blade assembly 202a, 202b usable with the trimmer 100 of FIG. 1. As with the previous embodiment, the first blade 202a and the second blade 202b each include a tang 204a, 204b at a proximal end. The first blade 202a and the second blade 202b extend from respective tangs 204a, 204b toward respective cutting edges with a generally uniform width. The cutting edges each begin at a kick 206a, 206b that flair the width of each blade 202a, 202b at one edge and not the opposite edge, which remains generally dull and does not perform any cutting. As in the previous embodiment, the blades 202a, 202b of the blade assembly can be held in close proximity by a rivet-in-slot arrangement. As shown in FIGS. 3A and 3B, a rivet 210 extending from one of the blades 202a, 202b can be mated with a slot 208 formed in the other of the blades 202a, 202b.

The cutting edges of the blade assembly are longer than the cutting edges of the previous embodiment, and include more teeth. As shown, the width of the first blade 202a is at a maximum along the first five teeth 220a-228a from a proximal end of the cutting edge. The widths of the first blade 202a is then stepwise reduced along the cutting edge to the distal end so that the next five teeth 230a-238a have cutting surfaces that are receded relative to the teeth that are closer to the proximal end of the cutting edge. The points of the first five teeth 220a-228a are aligned parallel to an axis formed along the length of the blade 202a, while the next five teeth 230-238a are aligned at an angle Q to the axis. The teeth 220a-238a of the cutting edge are substantially the same size and shape, and are oriented perpendicular to the axis formed along the length of the blade 202a. As shown, the teeth 220a-238a are shaped as isosceles triangles, although in other embodiments the teeth can have some other shape. The cutting edge of the second blade 202b, and the size, shape, and arrangement of the teeth of the second blade 202b are substantially the same as the first blade 202a. A portion 212 of the second blades can extend slightly past the cutting edge so that the blade lengths are the same.

FIG. 3B illustrates exemplary dimensions for the blades 202a, 202b of FIG. 3A. The dimensions are given in inches and are provided merely as examples. The invention is in no way meant to be limited to the exemplary dimensions provided.

Figure 4A:
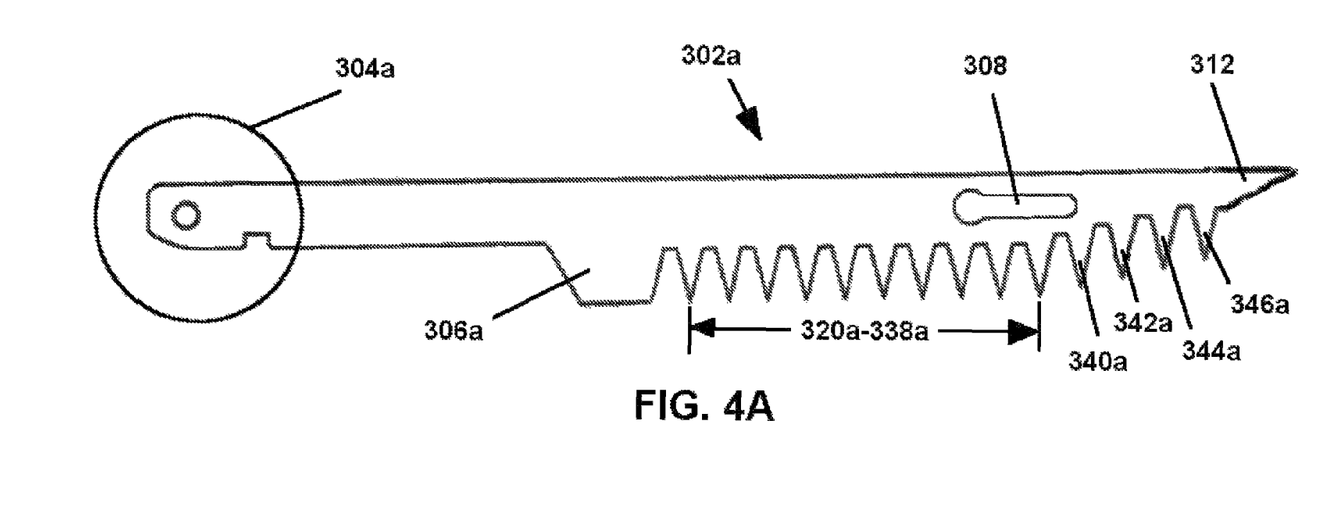
FIG. 4A is a side view of an alternative embodiment of a blade for use with embodiments of blade assemblies and trimmers in accordance with the present invention having a tooth for puncturing.
Figure 4B:
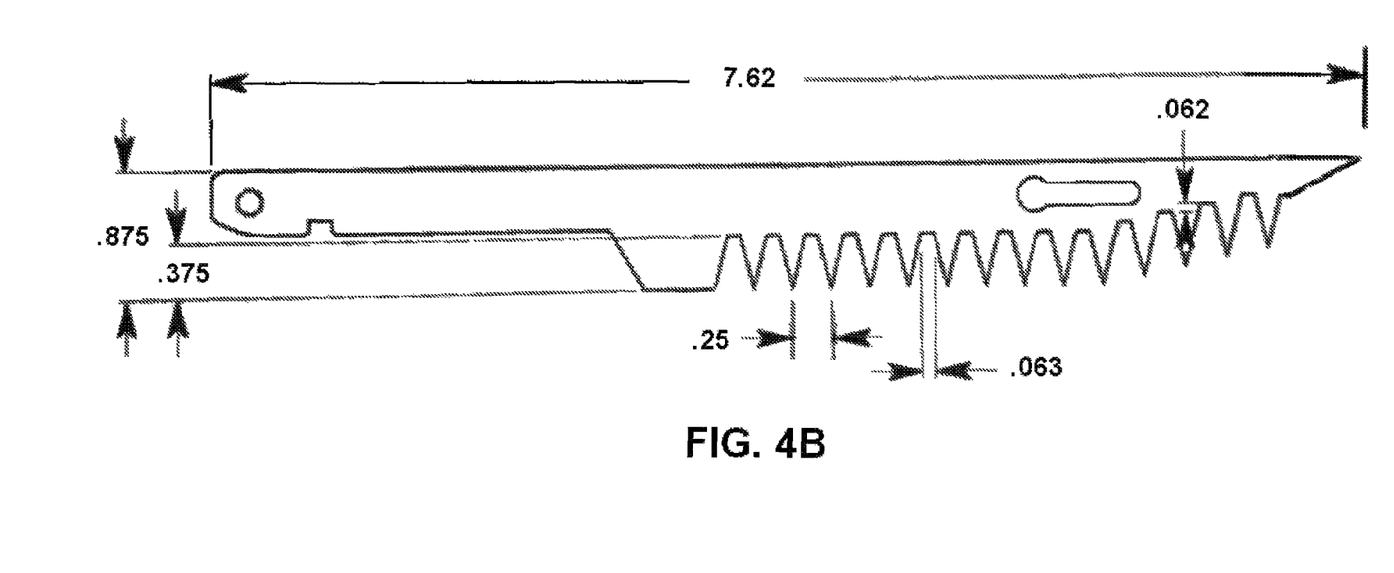
FIG. 4B illustrates exemplary dimensions for the blade of FIG. 4A.

FIGS. 4A and 4B are side views of an alternative embodiment of a single blade 302a of a dual acting blade assembly usable with the trimmer 100 of FIG. 1. As with the previous embodiments, the blade 302a includes a tang 304a at a proximal end. The blade 302a extends from the tang 304a toward a cutting edge with a generally uniform width. The cutting edges each begin at a kick 306a, 306b that flair the width of each blade 102a, 102b at one edge and not the opposite edge, which remains generally dull and does not perform any cutting. As in the previous embodiments, the blade 302a can be movably mated with a second blade to form the blade assembly with a rivet-in-slot arrangement.

The cutting edge of the blade is longer than the cutting edges of the previous embodiments, and includes more teeth with different numbers of receded and aligned teeth. As shown, the width of the blade 302a is at a maximum along the first ten teeth 320a-338a from a proximal end of the cutting edge. The widths of the blade 302a is then stepwise reduced along the cutting edge to the distal end so that the next four teeth 340a-346a have cutting surfaces that are receded relative to the teeth that are closer to the proximal end of the cutting edge. The points of the first ten teeth 320a-338a are aligned parallel to an axis formed along the length of the blade 302a, while the next four teeth 340-346a are aligned at an angle to the axis. The teeth 320a-346a of the cutting edge are substantially the same size and shape, and are oriented perpendicular to the axis formed along the length of the blade 302a. As shown, the teeth 320a-346a are shaped as isosceles triangles, although in other embodiments the teeth can have some other shape.

In addition to the fourteen teeth along the cutting edge, the blade 302a further includes a puncturing tooth 312 extending perpendicular to the axis of the blade 302a, the puncturing tooth 312 having the shape of a right triangle.

FIG. 4B illustrates exemplary dimensions for the blades 302a of FIG. 4A. The dimensions are given in inches and are provided merely as examples. The invention is in no way meant to be limited to the exemplary dimensions provided.

Figure 5A:
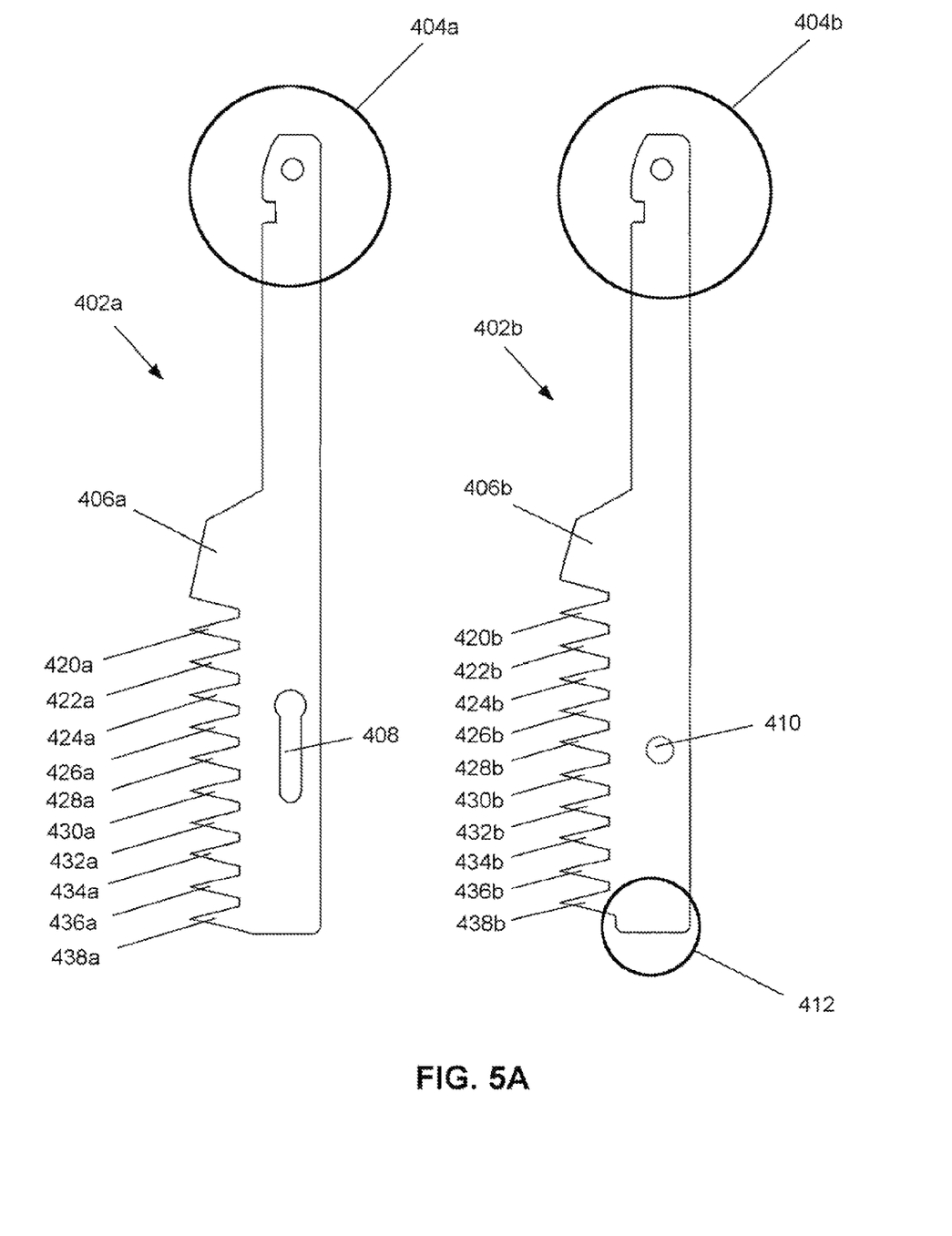
FIG. 5A is a side view of an alternative embodiment of a double acting blade assembly for use with embodiments of trimmers in accordance with the present invention.
Figure 5B:
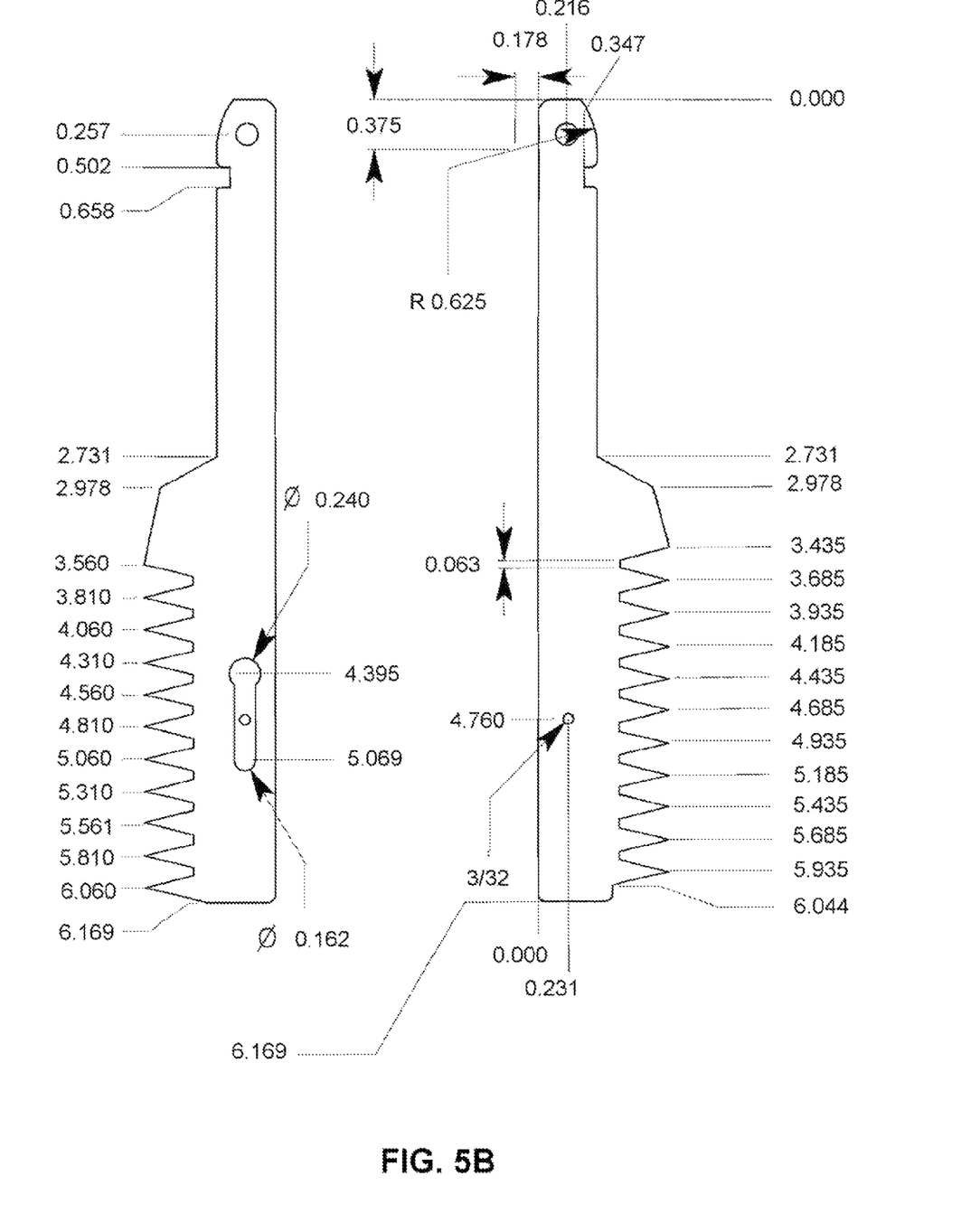
FIG. 5B illustrates exemplary dimensions for the double acting blade assembly of FIG. 5A.

Although in preferred embodiments, the cutting edge includes a width that is stepwise reduced with receded teeth;

in other embodiments all of the teeth can be aligned. FIGS. 5A and 5B are side views of an alternative embodiment of a double acting blade assembly 402a, 402b usable with the trimmer 100 of FIG. 1. As with the previous embodiment, the first blade 402a and the second blade 402b each include a tang 404a, 404b at a proximal end. The first blade 402a and the second blade 402b extend from respective tangs 404a, 404b toward respective cutting edges with a generally uniform width. The cutting edges each begin at a kick 406a, 406b that flair the width of each blade 402a, 402b at one edge and not the opposite edge, which remains generally dull and does not perform any cutting. As in the previous embodiment, the blades 402a, 402b of the blade assembly can be held in close proximity by a rivet-in-slot arrangement. As shown in FIGS. 5A and 5B, a rivet 410 extending from one of the blades 402a, 402b can be mated with a slot 408 formed in the other of the blades 402a, 402b The cutting edges of the blade assembly include ten teeth 420a-438a, 420b-438b. The points of the teeth 420a-438a, 420b-438b are aligned parallel to an axis formed along the length of the respective blades 402a, 402b. The teeth 420a-438a, 420b-438b of the cutting edge are substantially the same size and shape, and are oriented perpendicular to the axis formed along the length of the respective blades 402a, 402b. As shown, the teeth 420a-438a, 420b-438b are shaped as isosceles triangles, although in other embodiments the teeth can have some other shape. A portion 412 of the second blades can extend slightly past the cutting edge so that the blade lengths are the same.

FIG. 5B illustrates exemplary dimensions for the blades 402a, 402b of FIG. 5A. The dimensions are given in inches and are provided merely as examples. The invention is in no way meant to be limited to the exemplary dimensions provided.

Figure 6A:
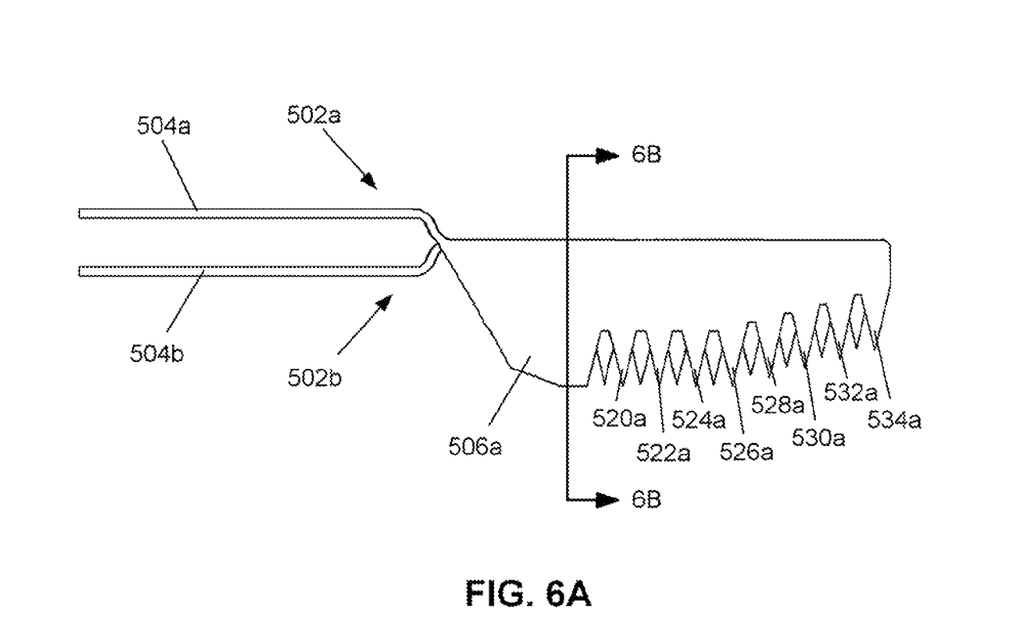
FIG. 6A is a top view of a further embodiment of a double acting blade assembly having two cutting edges arranged perpendicular to each other.
Figure 6B:
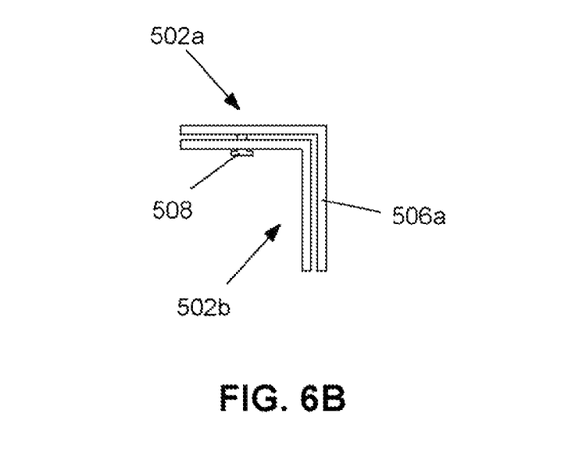
FIG. 6B is a cross-section of the double acting blade of assembly of FIG. 6A viewed toward the distal end of the blade assembly.

FIG. 6A is a top view and FIG. 6B is a cross-section view of a further embodiment of a double acting blade assembly 502a, 502b usable with the trimmer 100 of FIG. 1. The first and second blades 502a, 502b are shown mated, with the rivet 508 of one arranged within the slot of the other. As with previous embodiments, the first blade 502a and the second blade 502b each include a tang 504a, 504b at a proximal end. The first blade 502a and the second blade 502b extend from respective tangs 504a, 504b toward respective cutting edges with a generally uniform width. The cutting edges each begin at a kick 506a that flair the width of each blade 502a, 502b at one edge and not the opposite edge, which remains generally dull and does not perform any cutting. However, unlike previous embodiment, the blade assembly 502a, 502b includes another set of cutting edges that extend perpendicular to the first cutting edges so that the two sets of cutting edges are joined at their opposite edges. In other embodiments, the cutting edges can form some other angle, whether obtuse or acute. The width of one of the blades 502a, 502b is slightly reduced so that so that the blades 502a, 502b can be nested.

The sets of cutting edges of the blade assembly each resemble the cutting edges from the embodiment of FIGS. 2A and 2B. As shown, the width of the first blade 502a is at a maximum along the first four teeth 520a-526a from a proximal end of the cutting edge. The widths of the first blade 502a is then stepwise reduced along the cutting edge to the distal end so that the next four teeth 528a-534a have cutting surfaces that are receded relative to the teeth that are closer to the proximal end of the cutting edge. The points of the first four teeth 520a-526a are aligned parallel to an axis formed along the length of the blade 502a, while the next four teeth 528-534a are aligned at an angle to the axis. The teeth 520a-534a of the cutting edge are substantially the same size and shape, and are oriented perpendicular to the axis formed along the length of the blade 502a. As with previous embodiments, the teeth 520a-534a are shaped as isosceles triangles, although in other embodiments the teeth can have some other shape. The cutting edge of the second blade 502b, and the size, shape, and arrangement of the teeth of the second blade 502b are substantially the same as the first blade 502a.

Figure 7A:
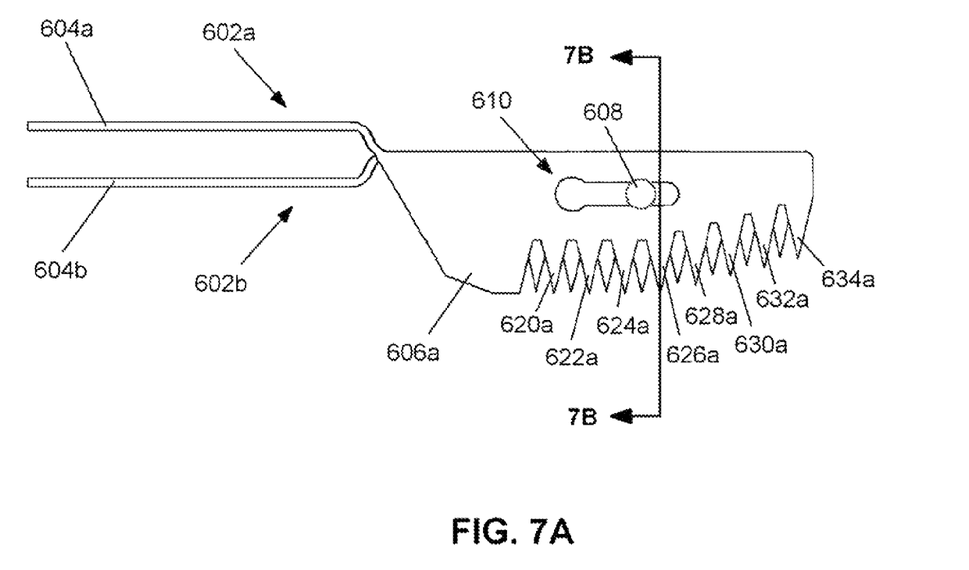
FIG. 7A is a top view of a further embodiment of a double acting blade assembly having a single cutting edge arranged perpendicular to a tang of the blade assembly.
Figure 7B:
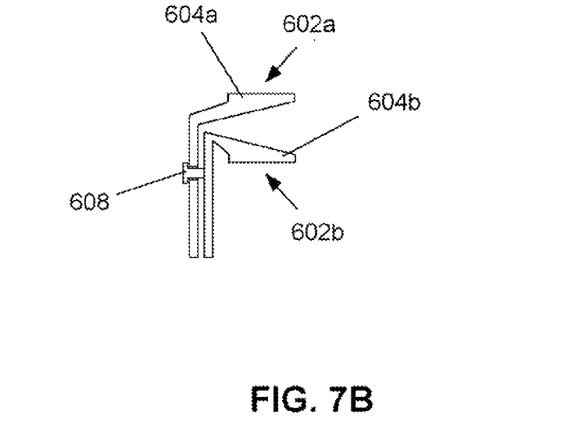
FIG. 7B is a cross-section of the double acting blade of assembly of FIG. 7A viewed toward the proximal end of the blade assembly.

FIG. 7A is a top view and FIG. 7B is a cross-section view of a further embodiment of a double acting blade assembly 602a, 602b usable with the trimmer 100 of FIG. 1. The first and second blades 602a, 602b are shown mated, with the rivet 608 of one arranged within the slot 610 of the other. As with previous embodiments, the first blade 602a and the second blade 602b each include a tang 604a, 604b at a proximal end. The first blade 602a and the second blade 602b extend from respective tangs 604a, 604b toward respective cutting edges with a generally uniform width. The cutting edges each begin at a kick 606a, the point at which the cutting edge extends perpendicular to the portion of the blade proximal of the kick 606a. The cutting edge extends from one edge of each blade 602a, 602b and not the opposite edge, which remains generally dull and does not perform any cutting. The width of one of the blades 602a, 602b is slightly reduced so that so that the blades 602a, 602b do not interfere with each other.

The sets of cutting edges of the blade assembly each resemble the cutting edges from the embodiment of FIGS. 2A and 2B. As shown, the width of the first blade 602a is at a maximum along the first four teeth 620a-626a from a proximal end of the cutting edge. The widths of the first blade 602a is then stepwise reduced along the cutting edge to the distal end so that the next four teeth 628a-634a have cutting surfaces that are receded relative to the teeth that are closer to the proximal end of the cutting edge. The points of the first four teeth 620a-626a are aligned parallel to an axis formed along the length of the blade 602a, while the next four teeth 628-634a are aligned at an angle to the axis. The teeth 620a-634a of the cutting edge are substantially the same size and shape, and are oriented perpendicular to the axis formed along the length of the blade 602a. As with previous embodiments, the teeth 620a-634a are shaped as isosceles triangles, although in other embodiments the teeth can have some other shape. The cutting edge of the second blade 602b, and the size, shape, and arrangement of the teeth of the second blade 602b are substantially the same as the first blade 602a.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

The invention claimed is:

1. A pair of blades one or both of which is adapted to be reciprocated along a longitudinal axis, the pair of blades comprising:
    a first blade having
        a proximal end,
        a distal end,
        a length extending between the proximal end and the distal end, and
        a cutting edge extending along a portion of the length to the distal end,
        wherein the cutting edge includes a series of teeth, and
        wherein a width of the first blade is stepwise reduced along the cutting edge to the distal end so that one or more teeth from the series of teeth has a cutting surface that is receded relative to a tooth from the series of teeth that is closer to the proximal end, and wherein the teeth of the series of teeth are uniformly oriented relative to the longitudinal axis; and a second blade having
  a proximal end,
  a distal end,
  a length extending between the proximal end and the distal end,
  a cutting edge extending along a portion of the length to the distal end,
  wherein the cutting edge includes a series of teeth, and
  wherein a width of the second blade is stepwise reduced along the cutting edge to the distal end so that one or more teeth from the series of teeth has a cutting surface that is receded relative to a tooth from the series of teeth that is closer to the proximal end, and
  wherein the teeth of the series of teeth are uniformly oriented relative to the longitudinal axis.

2. The pair of blades of claim 1, wherein:
the teeth of the series of teeth of the first blade are generally uniform in size and shape; and
the teeth of the series of teeth of the second blade are generally uniform in size and shape.

3. The pair of blades of claim 2, wherein the teeth of the first blade are generally the same size and shape as the teeth of the second blade.

4. The pair of blades of claim 3, wherein the teeth of the first blade and the teeth of the second blade have a triangle shape.

5. The pair of blades of claim 3, wherein the teeth of the first blade and the teeth of the second blade have an isosceles triangle shape.

6. The pair of blades of claim 1, wherein:
one of the first blade and the second blade includes a slot extending through a portion of the length of the blade; and
the other of the first blade and the second blade includes a rivet extending from the blade, the rivet being receivable within the slot;
wherein the rivet is free to travel within the slot.

7. The pair of blades of claim 1, further comprising:
the first blade having
  a tang extending from the proximal end of the first blade along a portion of the length of the first blade,
  a kick between the proximal and distal ends of the first blade, and
  wherein the cutting edge of the first blade extends from the kick to the distal end of the first blade; and
the second blade having
  a tang extending from the proximal end of the second blade along a portion of the length of the second blade,
  a kick between the proximal and distal ends of the second blade, and
  wherein the cutting edge of the second blade extends from the kick to the distal end of the second blade.

8. The pair of blades of claim 1, further comprising:
one or both of the first blade and the second blade having an end tooth extending from the distal end along the longitudinal axis.

9. The pair of blades of claim 1, wherein the series of teeth of the first blade and the second blade extend from a front side of the respective blade; and wherein a back side of the respective flat has a dull surface.

10. A trimmer comprising:
a housing;
a reciprocating drive within the housing and adapted to reciprocate one or both of a pair of blades along a longitudinal axis, the pair of blades including
  a first blade having
    a proximal end,
    a distal end,
    a length extending between the proximal end and the distal end, and
    a cutting edge extending along a portion of the length to the distal end,
    wherein the cutting edge includes a series of teeth, and
    wherein a width of the first blade is stepwise reduced along the cutting edge to the distal end so that one or more teeth from the series of teeth has a cutting surface that is receded relative to a tooth from the series of teeth that is closer to the proximal end, and
    wherein the teeth of the series of teeth are uniformly oriented relative to the longitudinal axis, and
  a second blade having
    a proximal end,
    a distal end,
    a length extending between the proximal end and the distal end,
    a cutting edge extending along a portion of the length to the distal end,
    wherein the cutting edge includes a series of teeth, and
    wherein a width of the second blade is stepwise reduced along the cutting edge to the distal end so that one or more teeth from the series of teeth has a cutting surface that is receded relative to a tooth from the series of teeth that is closer to the proximal end, and
    wherein the teeth of the series of teeth are uniformly oriented relative to the longitudinal axis.

11. The trimmer of claim 10, wherein:
the teeth of the series of teeth of the first blade are generally uniform in size and shape; and
the teeth of the series of teeth of the second blade are generally uniform in size and shape.

12. The trimmer of claim 10, wherein:
one of the first blade and the second blade includes a slot extending through a portion of the length of the blade; and
the other of the first blade and the second blade includes a rivet extending from the blade, the rivet being receivable within the slot; and
wherein the rivet is free to travel within the slot.

13. The trimmer of claim 10, further comprising:
the first blade having
  a tang extending from the proximal end of the first blade along a portion of the length of the first blade,
  a kick between the proximal and distal ends of the first blade, and
  wherein the cutting edge of the first blade extends from the kick to the distal end of the first blade; and
the second blade having
  a tang extending from the proximal end of the second blade along a portion of the length of the second blade,
  a kick between the proximal and distal ends of the second blade, and
  wherein the cutting edge of the second blade extends from the kick to the distal end of the second blade.

14. The trimmer of claim 11, wherein the teeth of the first blade are generally the same size and shape as the teeth of the second blade.

15. The trimmer of claim 11, wherein the teeth of the first blade and the teeth of the second blade have an isosceles triangle shape.

16. The trimmer of claim 10, further comprising:
one or both of the first blade and the second blade having an end tooth extending from the distal end along the longitudinal axis.

17. The trimmer of claim 10, wherein the series of teeth of the first blade and the second blade extend from a front side of the respective blade; and wherein a back side of the respective flat has a dull surface.

18. A pair of blades one or both of which is adapted to be reciprocated along a longitudinal axis, the pair of blades comprising:
a first blade having
a proximal end,
a distal end,
a length extending between the proximal end and the distal end, the length extending along a longitudinal axis,
a tang extending from the proximal end along a portion of the length,
a kick between the proximal and distal ends, and
a cutting edge extending from the kick to the distal end,
wherein the cutting edge includes a series of teeth of generally uniform size and shape, and
wherein a width of the blade is stepwise reduced along the cutting edge to the distal end so that one or more teeth from the series of teeth has a cutting surface that is receded relative to a tooth from the series of teeth that is closer to the kick, and
wherein the teeth are uniformly oriented relative to the longitudinal axis;
a second blade having
a proximal end,
a distal end,
a length extending between the proximal end and the distal end, the length extending along a longitudinal axis,
a tang extending from the proximal end along a portion of the length,
a kick between the proximal and distal ends, and
a cutting edge extending from the kick to the distal end,
wherein the cutting edge includes a series of teeth of generally uniform size and shape, and
wherein a width of the blade is stepwise reduced along the cutting edge to the distal end so that one or more teeth from the series of teeth has a cutting surface that is receded relative to a tooth from the series of teeth that is closer to the kick, and
wherein the teeth are uniformly oriented relative to the longitudinal axis;
wherein the other of the first blade and the second blade includes a slot extending through a portion of the length of the blade; and
wherein one of the first blade and the second blade includes a rivet extending from the blade, the rivet being received within the slot so that rivet travels freely within the slot.

19. The pair of blades of claim 18, wherein the teeth of the first blade are generally the same size and shape as the teeth of the second blade.

20. The pair of blades of claim 19, wherein the teeth of the first blade and the teeth of the second blade have an isosceles triangle shape.

21. The pair of blades of claim 18, further comprising:
one or both of the first blade and the second blade having an end tooth extending from the distal end along the longitudinal axis.

\* \* \* \* \*